(12) United States Patent
Murphy et al.

(10) Patent No.: US 10,057,725 B2
(45) Date of Patent: Aug. 21, 2018

(54) SENSOR-BASED GEOLOCATION OF A USER DEVICE

(71) Applicant: Viavi Solutions UK Limited, Berkshire (GB)

(72) Inventors: Christopher Michael Murphy, Bath (GB); Matthew James W. Brown, Hants (GB); Meng Wang, Guildford (GB); Gareth James Smith, Newbury (GB)

(73) Assignee: Viavi Solutions UK Limited, Berkshire (GB)

( * ) Notice: Subject to any disclaimer, the term of this patent is extended or adjusted under 35 U.S.C. 154(b) by 0 days.

(21) Appl. No.: 15/495,602

(22) Filed: Apr. 24, 2017

(65) Prior Publication Data

US 2017/0311127 A1    Oct. 26, 2017

Related U.S. Application Data

(60) Provisional application No. 62/327,096, filed on Apr. 25, 2016.

(51) Int. Cl.

| | |
|---|---|
| H04W 24/00 | (2009.01) |
| H04W 4/02 | (2018.01) |
| H04W 4/021 | (2018.01) |
| G01C 21/14 | (2006.01) |
| G01S 5/02 | (2010.01) |
| G01C 21/20 | (2006.01) |
| H04W 64/00 | (2009.01) |

(52) U.S. Cl.
CPC ............ H04W 4/026 (2013.01); G01C 21/14 (2013.01); G01C 21/206 (2013.01);
(Continued)

(58) Field of Classification Search
CPC ......... H04W 48/04; H04W 4/02; H04W 4/22; H04W 28/0289; H04W 88/06;
(Continued)

(56) References Cited

U.S. PATENT DOCUMENTS

| | | | |
|---|---|---|---|
| 9,020,525 B2 | 4/2015 | Murphy et al. | |
| 2005/0043037 A1* | 2/2005 | Ioppe ..................... | H04W 4/02 455/456.1 |

(Continued)

FOREIGN PATENT DOCUMENTS

| | | |
|---|---|---|
| WO | WO 2014/074837 | 5/2014 |
| WO | WO 2014/189495 | 11/2014 |

OTHER PUBLICATIONS

Extended European Search Report for European Application No. 17167828.7; dated Sep. 25, 2017, 7 pages.

(Continued)

*Primary Examiner* — Nimesh Patel
(74) *Attorney, Agent, or Firm* — Harrity & Harrity, LLP

(57) ABSTRACT

A device may determine a set of orientations or relative displacements at a set of locations. The set of locations may include at least a first location and a second location. The device may determine a set of sensor measurements relating to one or more measurable parameters at the set of locations. The device may determine, based on the set of orientations or relative displacements at the set of locations and the set of sensor measurements relating to the one or more measurable parameters at the set of locations, a path relating to the set of locations. The device may perform an action based on determining the path.

20 Claims, 6 Drawing Sheets

(52) U.S. Cl.
CPC .......... *G01S 5/0252* (2013.01); *G01S 5/0263* (2013.01); *G01S 5/0284* (2013.01); *H04W 4/021* (2013.01); *H04W 64/006* (2013.01)

(58) Field of Classification Search
CPC ..... H04W 48/02; H04W 48/06; H04W 48/08; H04W 48/12; H04W 28/0284; H04W 28/10; H04W 36/22; H04W 36/32; H04W 4/00; H04W 4/021; H04W 4/027; H04W 4/005; H04W 28/0236; H04B 7/0408; H04B 7/0632; H04B 17/345; H04B 1/69; H04B 5/00; H04B 5/0037; H04L 12/1407; H04L 1/00; H04L 1/0026; H04L 1/0027; H04L 1/0028; H04L 1/1861; H04L 1/1887; H04L 12/189; H04L 5/0005; G06Q 50/01; G06Q 30/0211; G06Q 30/0239; G06Q 10/00; G06Q 30/02; G06Q 30/0246; G06Q 30/0252; G06Q 30/0255; G06Q 30/0256; G06Q 30/0257; G06Q 30/0267; G06Q 50/184
See application file for complete search history.

(56) References Cited

U.S. PATENT DOCUMENTS

| | | | | |
|---|---|---|---|---|
| 2011/0090081 | A1* | 4/2011 | Khorashadi | G01S 5/0252 340/539.13 |
| 2011/0319100 | A1 | 12/2011 | Flanagan | |
| 2012/0264446 | A1* | 10/2012 | Xie | G01C 22/00 455/456.1 |
| 2012/0290636 | A1* | 11/2012 | Kadous | G01S 1/72 709/203 |
| 2013/0143588 | A1 | 6/2013 | Flanagan et al. | |
| 2013/0210449 | A1 | 8/2013 | Flanagan | |
| 2014/0171102 | A1* | 6/2014 | Murphy | G01S 5/0252 455/456.1 |
| 2014/0171104 | A1 | 6/2014 | Murphy et al. | |
| 2015/0281910 | A1* | 10/2015 | Choudhury | G01S 5/021 455/456.1 |
| 2016/0210449 | A1* | 7/2016 | Koch | G06F 21/31 |
| 2016/0337828 | A1* | 11/2016 | Michaelis | H04W 4/22 |

OTHER PUBLICATIONS

Wang et al., "No Need to War-Drive Unsupervised Indoor Localization", *MobiSys '12*, Jun. 25-29, 2012, 14 pages.
Esmerel: Elementary Physics, "How to Measure the Height of a Building With a Barometer (and other problems in elementary physics", http://www.esmerel.com/circle/question/building.html, Feb. 22, 1997, 4 pages.
Wikipedia, "Geolocation", https://en.wikipedia.org/wiki/Geolocation, Apr. 12, 2017, 2 pages.
Hoseini-Tabatabaei et al., "uDirect: A Novel Approach for Pervasive Observation of User Direction with Mobile Phones", Centre for Communication and Systems Research, University of Surrey Guildford, https://pdfs.semanticscholar.org/205a/12e11e74c9f8a5f3e37553204e6c759f5d61.pdf, 2011, 10 pages.

\* cited by examiner

SENSOR-BASED GEOLOCATION OF A USER DEVICE

RELATED APPLICATION

This application claims priority under 35 U.S.C. § 119 to U.S. Provisional Patent Application No. 62/327,096 filed on Apr. 25, 2016, the content of which is incorporated by reference herein in its entirety.

BACKGROUND

Geolocation is the identification or estimation of the real-world geographic location of an object, such as a radar source, mobile phone, or Internet-connected computer terminal. For example, geolocation may involve the generation of a set of geographic coordinates, and may be closely related to the use of positioning systems. Geolocation may be enhanced by the use of geographic coordinates to determine a meaningful location, such as a street address.

SUMMARY

According to some possible implementations, a device may comprise one or more processors configured to determine a set of orientations or relative displacements at a set of locations. The set of locations may include at least a first location and a second location. The one or more processors may be configured to determine a set of sensor measurements relating to one or more measurable parameters at the set of locations. The one or more processors may be configured to determine, based on the set of orientations or relative displacements at the set of locations and the set of sensor measurements relating to the one or more measurable parameters at the set of locations, a path relating to the set of locations. The one or more processors may be configured to perform an action based on determining the path.

According to some possible implementations, a non-transitory computer-readable medium may store one or more instructions that, when executed by one or more processors, cause the one or more processors to receive information related to a set of orientations or relative displacements at a set of locations. The set of locations may include at least a first location and a second location. The one or more instructions, when executed by the one or more processors, may cause the one or more processors to determine the set of orientations or relative displacements at the set of locations after receiving the information related to the set of orientations or relative displacements. The set of orientations or relative displacements may be determined from a first location of the set of locations. The one or more instructions, when executed by the one or more processors, may cause the one or more processors to determine a set of sensor measurements relating to one or more measurable parameters at the set of locations.

The one or more instructions, when executed by the one or more processors, may cause the one or more processors to determine, based on the set of orientations or relative displacements at the set of locations and the set of sensor measurements relating to the one or more measurable parameters at the set of locations, a path relating to the set of locations. The first location may be associated with a first sensor measurement, of the set of sensor measurements, and the second location, of the set of locations, may be associated with a second sensor measurement of the set of sensor measurements. The one or more instructions, when executed by the one or more processors, may cause the one or more processors to perform an action based on determining the path.

According to some possible implementations, a method may comprise determining, by a device, a set of orientations or relative displacements at a set of locations. The set of locations may include at least a first location and a second location. The method may comprise determining, by the device, a set of sensor measurements relating to one or more measurable parameters at the set of locations. The set of sensor measurements may be determined by a sensor of the device as the device moves among the set of locations. The method may comprise determining, by the device, a path relating to the set of locations based on the set of orientations or relative displacements at the set of locations and the set of sensor measurements relating to the one or more measurable parameters at the set of locations. The path may be determined using a processing technique that permits identification of a manner in which the device moved among the set of locations. The method may comprise performing, by the device, an action based on determining the path.

DETAILED DESCRIPTION

Figure 1A:
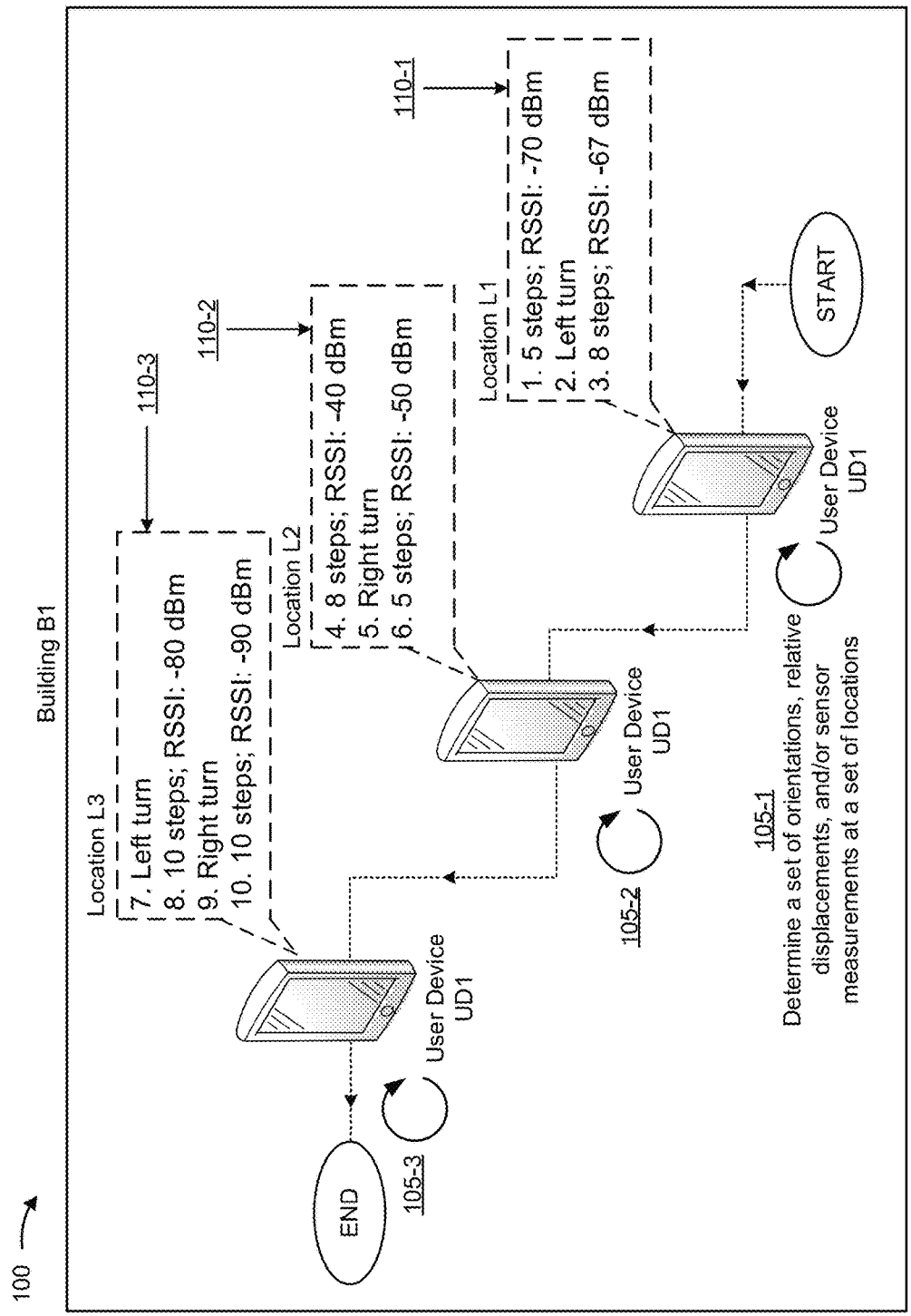
FIGS. 1A-1C are diagrams of an overview of an example implementation described herein.

The following detailed description of example implementations refers to the accompanying drawings. The same reference numbers in different drawings may identify the same or similar elements.

A user device may provide location based services. For example, the user device may utilize a global positioning system (GPS) module to determine a location of the user device, and may provide information based on the location of the user device. For example, the user device may report information identifying the location to a server device. Continuing with the previous example, the user device may provide information indicating that the user device is located at a particular location, and may receive response information from the server device based on the particular location.

Continuing still with the previous example, the server device may utilize the information identifying the location of the user device for altering a network configuration, performing performance engineering, determining whether to deploy a wireless access point to a particular location, and/or the like. However, GPS information may be unavailable or have insufficient accuracy in some locations, such as indoor locations, underground locations, locations a threshold distance from a wireless access point, locations without unobscured access to a GPS system, and/or the like.

In some cases, a user device may perform a dead reckoning technique when GPS information is unavailable or insufficiently accurate. For example, from a first location, the user device may determine a relative displacement and a relative orientation (e.g., relative to the first location and an initial orientation at the first location). In this case, the user device may determine that the user device is at a second location based on the relative displacement and the relative orientation. However, errors in calculating the relative displacement and the relative orientation, although small, may be compounded over time and distance, causing the user device to determine a calculated location that is relatively far from an actual location. Moreover, errors in calculating the relative displacement and the relative orientation may be relatively large for some sensors, thereby resulting in relatively poor location accuracy.

Implementations, described herein, provide a user device that is capable of utilizing information regarding other measurements of the user device (e.g., a sensor measurement of a measurable parameter at a location) and an optimization process to perform location determination with a reduced error rate relative to using the dead reckoning technique based on relative displacements and relative orientations.

In this way, the user device may determine a location with a greater accuracy relative to using the dead reckoning technique and at a time when GPS information is unavailable or insufficiently accurate. Moreover, the implementations may store information identifying the other measurements to generate a spatial distribution of the other measurements. The spatial distribution may be utilized for a subsequent geolocation without performing the dead reckoning technique, for radio communication system performance engineering, and/or the like.

Figure 1B:
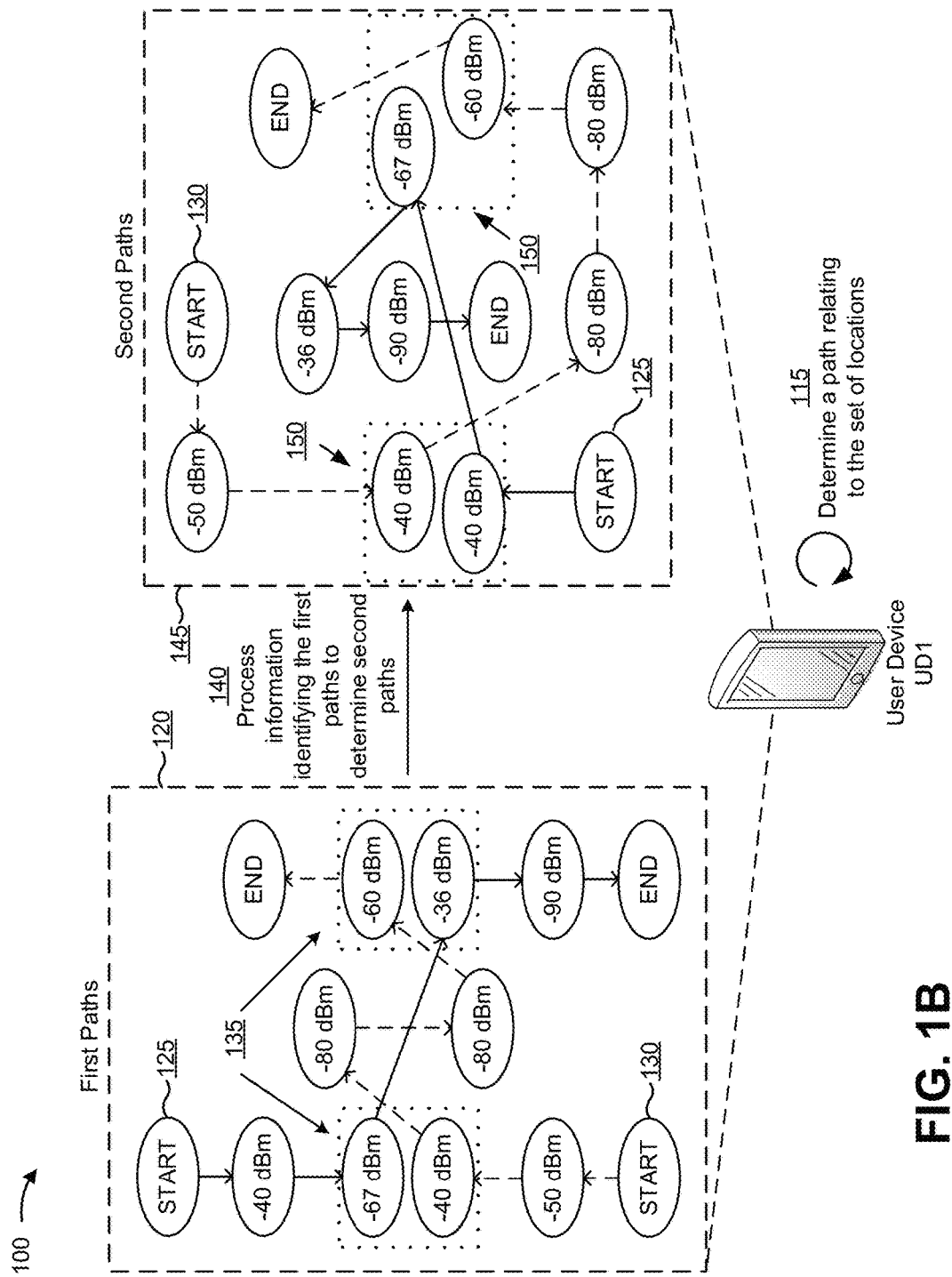
Figure 1C:
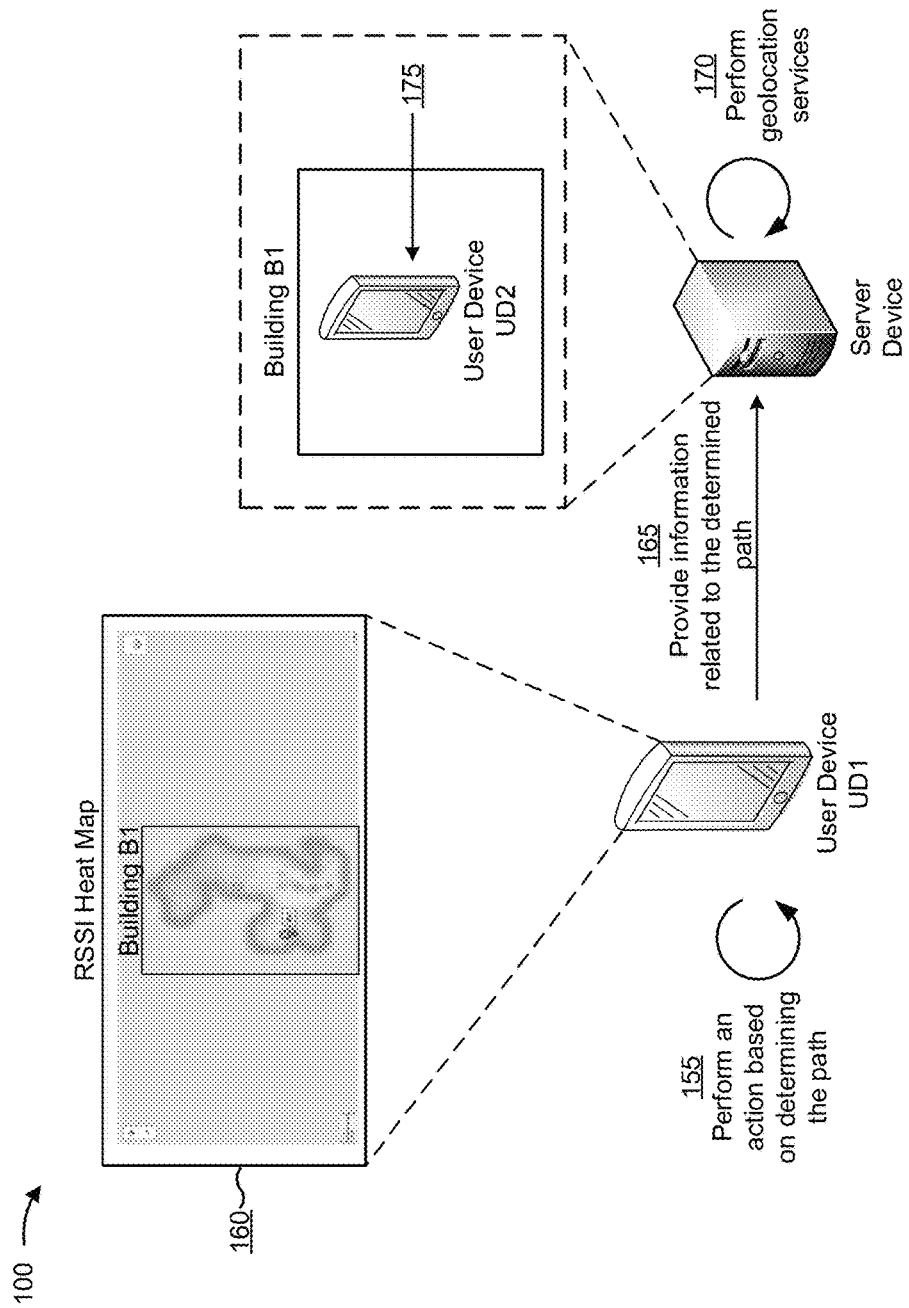

FIGS. 1A-1C are diagrams of an overview of an example implementation 100 described herein. Example implementation 100 includes a user device UD1 located within building B1. Assume, for example, that a user of user device UD1 is moving about within building B1. As shown in FIG. 1A, and by reference numbers 105-1 through 105-3, user device UD1 may determine a set of orientations, relative displacements, and/or sensor measurements at a set of locations as a user of user device UD1 moves through building B1. For example, user device UD1 may determine a quantity of steps from a start location (e.g., shown as "START"), or a previous location, a direction of turns of user device UD1, a received signal strength indication (RSSI) measurement at various locations, and/or the like. As specific examples, and as shown by reference numbers 110-1 through 110-3, user device UD1 may determine a set of orientations, relative displacements, and/or sensor measurements at locations L1 through L3.

As shown in FIG. 1B, and by reference number 115, user device UD1 may determine a path relating to the set of locations. For example, and as shown by reference number 120, user device UD1 may determine first paths 125 (shown using solid lines) and 130 (shown using dashed lines) relating to the set of locations (e.g., by detecting the steps and/or turns of a user of user device UD1 from an initial location, shown as "START"). For example, user device UD1 may determine the first paths 125 and 130 using a dead reckoning technique based on the determined orientations and/or relative displacements of user device UD1. User device UD1 may determine the first paths 125 and 130 based on movements of the same user device UD1 or of multiple different user devices.

As shown by reference number 135, using a dead reckoning technique may result in potential errors. For example, the first paths 125 and 130 may have different sensor measurements for the same location (e.g., the sensor measurements vary by a threshold amount), indicating a potential error with the dead reckoning technique that was used to determine the first paths shown by reference number 120.

As further shown in FIG. 1B, and by reference number 140, user device UD1 may process information identifying the first paths to determine second paths. For example, user device UD1 may process first paths 125 and 130, and corresponding sensor measurements, using a technique to generate second paths shown by reference number 145. Continuing with the previous example, user device UD1 may process the information using a hill climber algorithm, a simulated annealer, a particle swarm optimization (PSO) technique, an evolutionary algorithm, and/or the like.

Processing the first paths may reduce potential errors identified in the first paths. For example, as shown by reference numbers 150, user device UD1 has generated second paths such that sensor measurements at the same location differ by less than a threshold amount. In this way, user device UD1 may process first paths determined using a dead reckoning technique to determine second paths. By processing the first paths to determine the second paths, user device UD1 may reduce or eliminate potential errors associated with the first paths, thereby improving an accuracy of a first path that user device UD1 determines via a dead reckoning technique.

As shown in FIG. 1C, and by reference number 155, user device UD1 may perform an action based on determining the path. For example, user device UD1 may generate an RSSI heat map 160 of sensor measurements (e.g., by taking an average, mean, median, weighted average, weighted mean, weighted median, a centroid, and/or value closest to the centroid, of a cluster of sensor measurements). User device UD1 may generate RSSI heat map 160 of building B1 based on the second paths that user device UD1 determined. In this way, user device UD1 may generate a visual representation of a spatial distribution of a measurable parameter, such as RSSI.

As another example of performing an action, and as shown by reference number 165, user device UD1 may provide information related to the determined path (e.g., the second paths) to a server device. As shown by reference number 170, and for example, the server device may perform geolocation services after receiving the information from user device UD1. Continuing with the previous example, and as shown by reference number 175, the server device may geo-locate user device UD2 in building B1 based on information gathered by UD2 (e.g., by comparing RSSI measurements that user device UD2 is gathering and RSSI measurements that user device UD1 gathered and determining a location of user device UD2 where the RSSI measurements match).

In this way, a user device may determine a location with a greater accuracy relative to using a dead reckoning technique. Moreover, information related to the determined path may be utilized to generate a grid map, a heat map, and/or the like, and/or may be provided to a server device for performing geolocation services for other user devices (e.g., without the other user device having to perform a dead reckoning technique, thereby conserving processing resources of the other user devices), for radio communication system performance engineering, and/or the like.

As indicated above, FIGS. 1A-1C are provided merely as an example. Other examples are possible and may differ from what was described with regard to FIGS. 1A-1C. For example, one or more operations, described as being performed by the user device, can be performed by the server device and/or one or more operations, described as being performed by the server device, can be performed by the user device.

Figure 2:
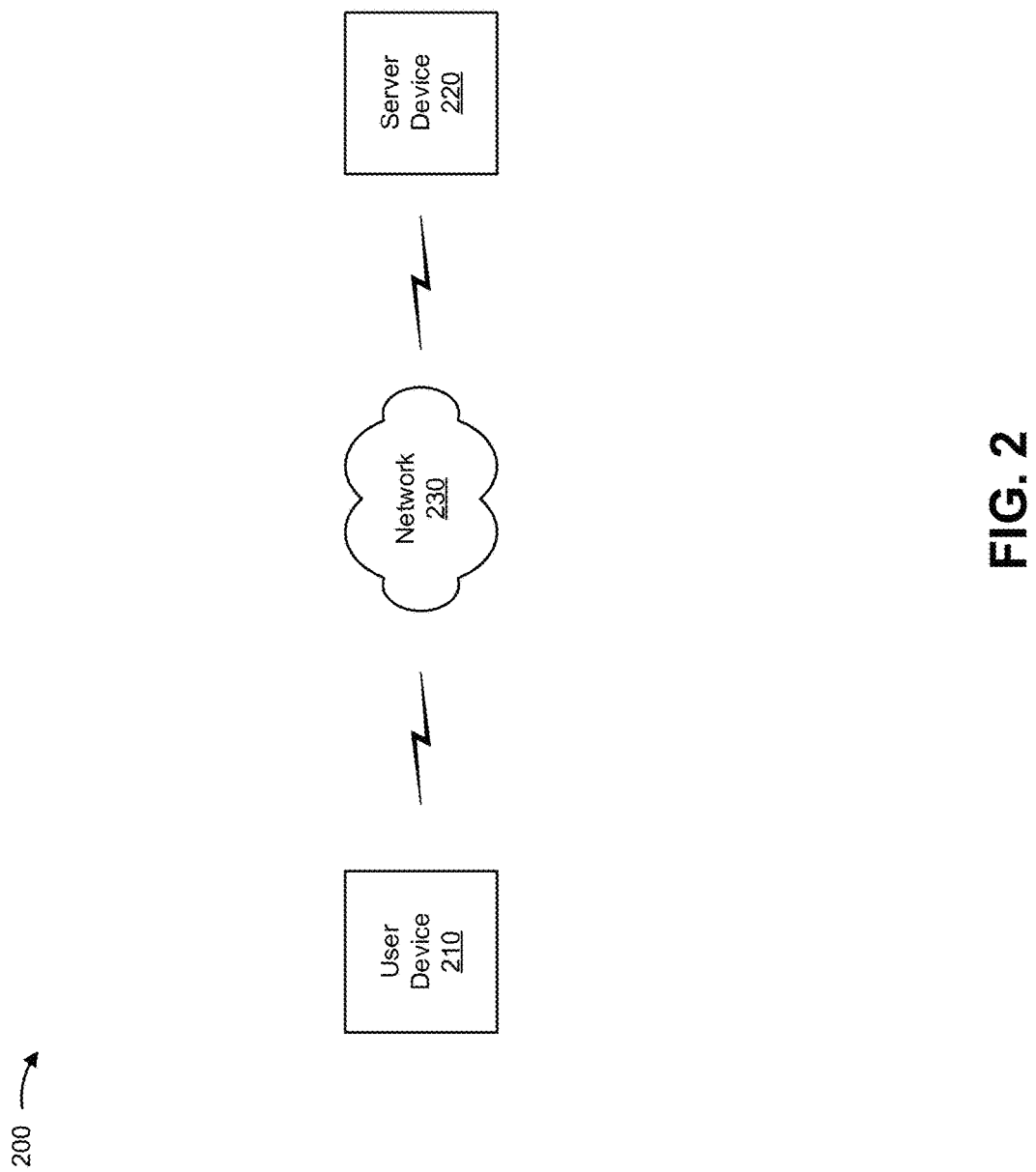
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include user device 210, server device 220, and network 230. Devices of environment 200 may interconnect via wired connections, wireless connections, or a combination of wired and wireless connections.

User device 210 includes one or more devices capable of receiving, generating, storing, processing, and/or providing information associated with sensor-based geolocation of a user device. For example, user device 210 may include a mobile phone (e.g., a smart phone or a radiotelephone), a laptop computer, a tablet computer, a gaming device, a wearable communication device (e.g., a smart wristwatch or a pair of smart eyeglasses), a Wi-Fi meter, an RSSI meter, a robot, an unmanned aerial vehicle (UAV), or a similar type of device. In some implementations, user device 210 may include a sensor for detecting a measurable parameter (e.g., RSSI, a chemical, etc.), as described elsewhere herein. In some implementations, user device 210 may determine a set of orientations, relative displacements, and/or sensor measurements at a set of locations, as described elsewhere herein. Additionally, or alternatively, user device 210 may determine a path of user device 210 based on the set of orientations, relative displacements, and/or sensor measurements, as described elsewhere herein.

Server device 220 includes one or more devices capable of receiving, generating, storing, processing, and/or providing information associated with sensor-based geolocation of a user device. For example, server device 220 may include a server (e.g., in a data center or a cloud computing environment), a data center (e.g., a multi-server micro data center), a workstation computer, a virtual machine (VM) provided in a cloud computing environment, or a similar type of device. In some implementations, server device 220 may include a communication interface that allows server device 220 to receive information from and/or transmit information to other devices in environment 200. In some implementations, server device 220 may receive information related to a path, a set of orientations, relative displacements, and/or sensor measurements that user device 210 determines, as described elsewhere herein. Additionally, or alternatively, server device 220 may aggregate the information with information from multiple other user devices 210, perform geolocation services using the information, analyze the information, and/or the like, as described elsewhere herein.

Network 230 includes one or more wired and/or wireless networks. For example, network 230 may include a cellular network (e.g., a long-term evolution (LTE) network, a code division multiple access (CDMA) network, a 3G network, a 4G network, a 5G network, or another type of cellular network), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
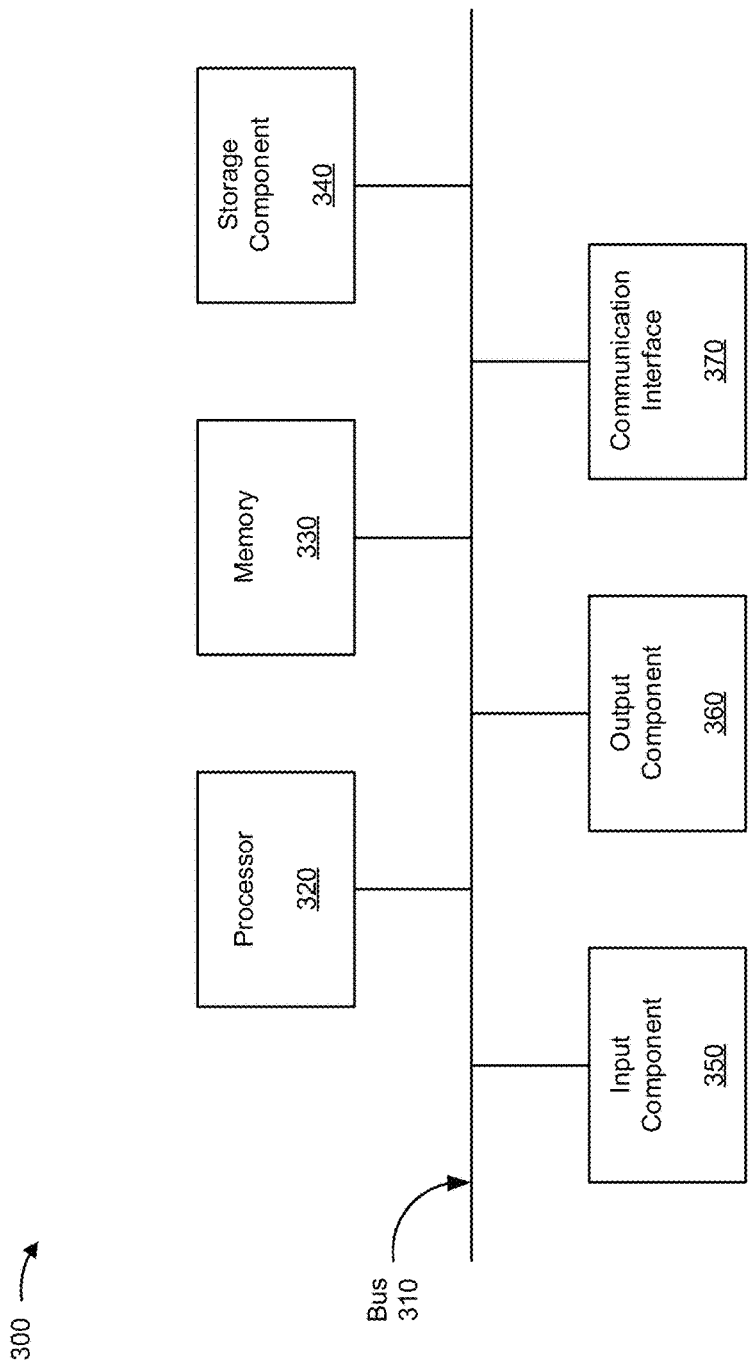
FIG. 3 is a diagram of example components of one or more devices of FIG. 2.

FIG. 3 is a diagram of example components of a device 300. Device 300 can correspond to user device 210 and/or server device 220. In some implementations, user device 210 and/or server device 220 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a Wi-Fi interface, a cellular network interface, or the like.

Device 300 can perform one or more processes described herein. Device 300 can perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
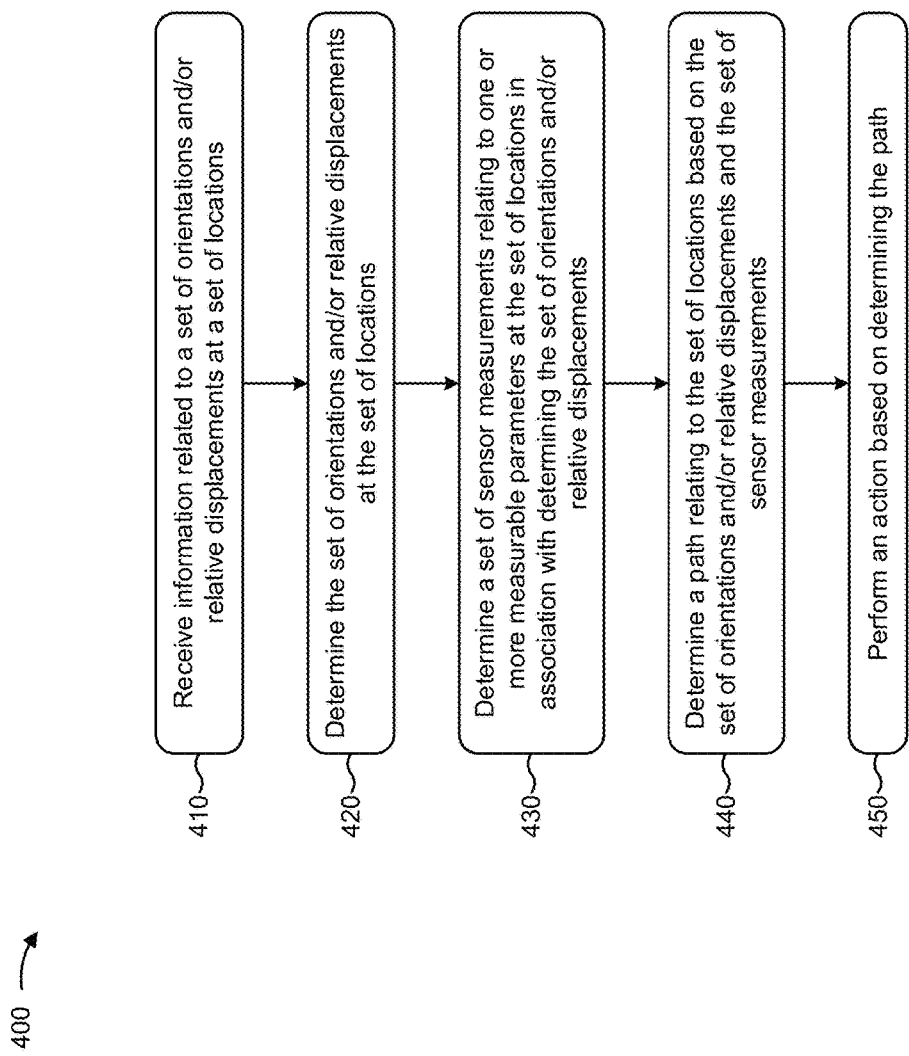
FIG. 4 is a flow chart of an example process for sensor-based geolocation of a user device.

FIG. 4 is a flow chart of an example process 400 for sensor-based geolocation of a user device. In some implementations, one or more process blocks of FIG. 4 may be performed by user device 210. In some implementations, one or more process blocks of FIG. 4 may be performed by another device or a group of devices separate from or including user device 210, such as server device 220.

As shown in FIG. 4, process 400 may include receiving information related to a set of orientations and/or relative displacements at a set of locations (block 410). For example, user device 210 may receive information related to a set of orientations and/or relative displacements at a set of locations. In some implementations, user device 210 may receive the information periodically, according to a schedule, based on requesting the information from another device (e.g., another user device 210 or server device 220), based on input from a user of user device 210, and/or the like.

Additionally, or alternatively, user device 210 may receive the information from a sensor of user device 210. For example, a sensor may include an accelerometer, a gyroscope, a barometer, a GPS component, a magnetometer, an actuator, a relative signal strength indication (RSSI) meter, a Wi-Fi analyzer, a radiation detection sensor, a chemical detection sensor, and/or the like. In other words, a sensor may include any component that can detect and/or measure an orientation of user device 210, a relative displacement of user device 210, a measurable parameter at a location, and/or the like, as described elsewhere herein.

In some implementations, an orientation may include a relative physical position or direction of an object (e.g., user device 210, a user of user device 210, etc.). In some implementations, for example, an orientation may include an orientation of user device 210 relative to a particular plane (e.g., a vertical plane and/or a horizontal plane). Additionally, or alternatively, and as another example, an orientation may include an orientation of user device 210 relative to magnetic north.

Additionally, or alternatively, an orientation may include an orientation of user device 210 relative to another user device 210. Additionally, or alternatively, an orientation may include an orientation of another user device 210. For example, a first user device 210 may receive information related to an orientation of a second user device 210. Additionally, or alternatively, and as another example, a first user device 210 may receive information related to a relative displacement of a second user device 210, a position of a second user device 210, or other information related to a location and/or a sensor measurement of a second user device 210.

In some implementations, a displacement may include a distance from a first location to a second location of an object. Additionally, or alternatively, a displacement may include a displacement of another user device 210. In some implementations, a relative displacement may quantify both the distance and direction of a motion from a first location to a second location (e.g., an imaginary motion along a straight line). In some implementations, a relative displacement may include a displacement of an object with respect to an initial location or another location subsequent to an initial location. For example, a relative displacement may be based on a quantity of steps of a user of user device 210 from an initial location, a direction of a set of turns of a user of user device 210 from an initial location, an altitude change of user device 210 from an initial location, and/or the like.

In some implementations, a location may include a particular place or position (e.g., within a space, within an area of interest, etc.). For example, a location may include an initial location of user device 210. Additionally, or alternatively, a location may include a subsequent location of user device 210 after a user of user device 210 has moved (e.g., within a space). Additionally, or alternatively, a location may include a location of another user device 210.

In this way, user device 210 may receive information related to a set of orientations and/or relative displacements at a set of locations.

As further shown in FIG. 4, process 400 may include determining the set of orientations and/or relative displacements at the set of locations (block 420). For example, user device 210 may determine the set of orientations and/or relative displacements at the set of locations. In some implementations, user device 210 may determine the set of orientations and/or relative displacements at the set of locations using information from a sensor of user device 210.

In some implementations, for example, user device 210 may determine an orientation and/or a relative displacement of a movement of user device 210 relative to magnetic north using a magnetometer of user device 210. For example, user device 210 may determine that user device 210 is moving in a 90 degree direction relative to magnetic north. Additionally, or alternatively, for example, user device 210 may determine an orientation and/or a relative displacement of user device 210 within a plane using a gyroscope of user device 210. For example, user device 210 may use a gyroscope and/or an accelerometer to establish a horizontal and/or a vertical plane through which user device 210 may move, whether user device 210 is moving horizontally or vertically (e.g., after establishing the vertical and/or horizontal plane), whether user device 210 has made a turn, and/or the like.

In some implementations, user device 210 may use a technique to determine the set of orientations and/or relative displacements at the set of locations. In some implementations, the technique may include a dead reckoning technique. For example, dead reckoning may use estimates of the direction and rate of motion in order to estimate a vector translation from some initial position to some subsequent position. In some implementations, when using a dead reckoning technique, user device 210 may estimate a vector from a location based on information related to direction and rate of movement of user device 210 from the location. For example, user device 210 may determine a relative displacement of user device 210 from an initial location by monitoring an accelerometer of user device 210 (e.g., to identify a step of a user of user device 210) and/or a gyroscope of user device 210 (e.g., to identify a turn of user device 210) to determine a direction and/or distance of movement of a user of user device 210.

Additionally, or alternatively, user device 210 may use information identifying spatial distribution of a measurable parameter (e.g., a previously measured measurable parameter). For example, user device 210 may use the spatial distribution of some measurable parameter, such as RSSI or signal quality of one or more wireless transmitters as previously measured, to determine the location that best matches the current RSSI or signal quality of a signal received by user device 210. Continuing with the previous example, a first user device 210 may compare RSSI measurements gathered by a first user device 210 and RSSI measurements gathered by a second user device 210 to determine an orientation of the first user device 210, a displacement of first user device 210, and/or a location of first user device 210 when the comparison indicates a match (or when a difference between the measurements satisfies a threshold).

In some implementations, user device 210 may use a pattern recognition technique, a signature matching technique, and/or an interpolation algorithm to perform the comparison. For example, user device 210 may perform the comparison using a K nearest neighbor technique.

Additionally, or alternatively, user device 210 may use a GPS measurement, or another measurement related to a global navigation satellite system (GNSS) (e.g., when available) to determine the set of orientations, relative displacements, and/or locations. For example, user device 210 may use a GPS measurement to verify, or increase an accuracy of, determination of an orientation, relative displacement, and/or location of user device 210 (e.g., by modifying a result of a dead reckoning technique based on a GPS measurement).

Additionally, or alternatively, user device 210 may use information related to a location of a wireless access point and/or base station in combination with information related to signal propagation time, round trip delay, time difference of arrival, signal propagation loss, and/or the like, of a wireless access point and/or a base station when determining a location, an orientation, and/or a relative displacement of user device 210. For example, user device 210 may use the information related to the access point and/or the base station to verify, or increase an accuracy of, a determined location, orientation, and/or relative displacement (e.g., by modifying a result of a dead reckoning technique). In this way, user device 210 may improve an accuracy of and/or refine a determined path, location, orientation, relative displacement, and/or the like, using information related to a wireless access point.

In some implementations, user device 210 may define a coordinate system prior to determining the set of orientations and/or relative displacements at the set of locations. For example, user device 210 may define a horizontal plane and/or a vertical plane relative to which user device 210 may calculate an orientation and/or a relative displacement. In some implementations, user device 210 may define the coordinate system arbitrarily and automatically. Additionally, or alternatively, a user of user device 210 may manually define the coordinate system by pointing user device 210 in a known direction (e.g., aligned with magnetic north, or parallel with a wall of a building being surveyed) and registering that direction as being part of a horizontal plane or vertical plane of a coordinate system.

In some implementations, when determining an orientation and/or a relative displacement, user device 210 may convert a measurement of a sensor of user device 210 to the coordinate system. For example, user device 210 may perform accelerometer and gyroscopic measurements and convert the measurements into a coordinate system (e.g., a horizontal direction and a vertical direction). In this way, by continuously monitoring the orientation of user device 210 and converting sensor measurements to the coordinate system, the technique may be robust to subsequent changes in position of user device 210 during sensor measurement collection. For example, a user of user device 210 may hold user device 210 horizontally oriented in a hand of the user for part of the survey process, but then may hold user device 210 vertically oriented in a trouser pocket for the remainder of the process.

In some implementations, user device 210 may determine an initial orientation of user device 210 prior to determining the set of orientations and/or relative displacements at the set of locations. For example, user device 210 may determine an initial orientation relative to magnetic north, within a horizontal and/or vertical plane, based on input from a user of user device 210, and/or the like. In some implementations, user device 210 may determine subsequent orientations and/or displacements relative to this initial orientation.

In some implementations, when determining an orientation and/or a relative displacement, user device 210 may perform step detection (e.g., based on accelerometer and/or gyroscope sensor measurements). In some implementations, user device 210 may continuously collect accelerometer data and convert the accelerometer data to the coordinate system. For example, user device 210 may continuously monitor the accelerometer measurement in the vertical plane. Continuing with the previous example, user device 210 may infer a step to have occurred in the time between consecutive peaks in vertical acceleration (e.g., prior to using, or based on, a fast Fourier transform technique) detected using the accelerometer. Continuing still with the previous example, user device 210 may apply further filtering. For example, if the time interval between each inferred step satisfies a threshold, then this step may be ignored.

In some implementations, user device 210 may perform step direction estimation based on a combination of gyroscope and magnetometer sensor measurements. For example, user device 210 may compare a gyroscope sensor measurement and a magnetometer sensor measurement to identify an error with either the gyroscope sensor measurement or the magnetometer sensor measurement (e.g., where one of the sensor measurements indicates a particular step direction that differs from a step direction indicated by the other sensor measurement by a threshold amount). Additionally, or alternatively, and as another example, user device 210 may combine a gyroscope measurement and a magnetometer measurement to generate a vector for step direction that represents both the gyroscope sensor measurement and the magnetometer sensor measurement. This improves an accuracy of a step direction estimate by using information from multiple sensors to determine, or correct, errors in sensor measurements related to step direction estimation, thereby improving a determined path.

In some implementations, user device 210 may perform step direction estimation based on a combination of accelerometer and gyroscope sensor measurements. For example, during regular walking motion, a frequency of acceleration oscillation in the vertical direction and a fundamental frequency of acceleration oscillation in the step direction may be the same (e.g., $\omega$). As another example, the frequency of acceleration oscillation orthogonal to both the vertical direction and step direction may be one-half of ω (e.g., ω/2).

In some implementations, user device 210 may utilize this relationship to determine a step direction. For example, user device 210 may analyze a time series segment of accelerometer measurements between each detected step in a coordinate system to obtain the actual step direction. Continuing with the previous example, user device 210 may determine that a coordinate transformation of accelerometer measurements indicates that two of the transformed accelerations have twice the frequency of a third transformed acceleration. Continuing still with the previous example, user device 210 may determine the step direction based on the coordinate transformation of the third acceleration.

In some implementations, user device 210 may perform a fast Fourier transform on the accelerometer measurements, such as by converting accelerometer measurements to a representation in a frequency domain. This may permit user device 210 to identify the directions of the fundamental oscillations due to the step motions, which in turn may permit user device 210 to identify the step direction.

In some implementations, user device 210 may provide better accuracy based on performing the methods described above over multiple steps (e.g., via an averaging procedure). For example, user device 210 may estimate step length as a default constant, as manually defined, or may estimate step length based on the accelerometer measurements.

In some implementations, user device 210 may perform movement estimation based on video footage and/or a set of images captured by user device 210. For example, for user devices 210 with a camera, if user device 210 is oriented such that the camera is continuously pointing at some fixed reference, such as a floor, wall, or ceiling, and this fixed reference has regularly-spaced features (e.g., ceiling tiles or carpet tiles), user device 210 may infer how far user device 210 has travelled (in arbitrary units defined by the repeated feature size) based on the changing image as user device 210 moves around the environment. In some implementations, if the ceiling and/or floor pattern is irregular, user device 210 may use image recognition software combined with focus distance information available from the camera of user device 210 to determine movement of user device 210 by tracking apparent movement of the fixed features on the ceiling, floor, and/or wall. In this way, user device 210 may use a camera to determine an orientation and/or relative displacement of user device 210, thereby improving determination of the orientation and/or relative displacement of user device 210.

In some implementations, when user device 210 performs movement direction estimation, user device 210 may infer a change in direction of user device 210 when user device 210 turns during movement. For example, a rotational translation of a video image may indicate a change in direction of user device 210.

In some implementations, user device 210 may express determined orientations, relative displacements, and/or locations, for example, in longitude and/or latitude. For example, user device 210 may determine an origin and compass bearing for a coordinate system. In some implementations, user device 210 may continuously record GPS position measurements during data collection activity, when GPS data is available, and may average multiple GPS position measurements. In some implementations, user device 210 may linearly translate step positions so that the step positions share the same centroid in latitude and/or longitude as the GPS position measurements. This improves estimates of step positions relative to not using GPS position measurements, thereby improving determination of a path.

For example, user device 210 may continuously record an estimate of magnetic north (e.g., as measured in the coordinate system), and may average the recorded values (e.g., using an angular average algorithm). In some implementations, user device 210 may rotate the measurement coordinate system of user device 210 so that the measurement coordinate system aligns with magnetic north. In this way, user device 210 may use a known point relative to which user device 210 may determine an orientation and/or relative displacement, thereby improving determination of an orientation and/or relative displacement.

In some implementations, user device 210 may apply the techniques described herein using multiple devices. For example, user device 210 may apply the techniques discussed herein to measurements made by different user devices 210, and/or by the same user device 210 at different times. This improves an accuracy of user device 210 by increasing the amount of information that user device 210 can use to determine an orientation and/or relative displacement of user device 210.

In this way, user device 210 may determine a set of orientations and/or relative displacements at a set of locations.

As further shown in FIG. 4, process 400 may include determining a set of sensor measurements relating to one or more measurable parameters at the set of locations in association with determining the set of orientations and/or relative displacements (block 430). For example, user device 210 may determine a set of sensor measurements relating to one or more measurable parameters at the set of locations in association with determining the set of orientations and/or relative displacements. In some implementations, user device 210 may determine the set of sensor measurements using a sensor of user device 210.

In some implementations, a measurable parameter may include a property that can exist as a magnitude or multitude, and that can be determined quantitatively. In some implementations, a measurable parameter may include radio frequency (RF) and/or electromagnetic measurements, such as signal strength or signal quality of a wireless communication system, and/or spectral power for a frequency range. Additionally, or alternatively, a measurable parameter may include sound volume, temperature, fluid pressure, a light level, a radiation level, a presence of a chemical (e.g., that satisfies a threshold), magnetic field strength, flux, heart rate, blood pressure, blood chemistry, and/or the like.

In some implementations, a value for a measurable parameter may vary by location. Additionally, or alternatively, a value for a measurable parameter may vary by a threshold amount or may vary by less than a threshold amount.

In some implementations, user device 210 may determine the set of sensor measurements to identify an issue associated with a measurable parameter. For example, user device 210 may identify a value for a measurable parameter that satisfies a threshold, fails to satisfy a threshold, satisfies a first threshold but not a second threshold, and/or the like. Additionally, or alternatively, and as another example, the issue may identify a potential or actual threat to health, an impaired communication system, and/or the like.

In some implementations, user device 210 may determine the set of sensor measurements in real-time or near real-time. For example, user device 210 may determine the set of sensor measurements as user device 210 (or a user of user device 210) moves through a space, such as a building, a room, a quarantined area, and/or the like.

In this way, user device 210 may determine a set of sensor measurements relating to one or more measurable parameters at a set of locations in association with determining the set of orientations and/or relative displacements.

As further shown in FIG. 4, process 400 may include determining a path relating to the set of locations based on the set of orientations and/or relative displacements and the set of sensor measurements (block 440). For example, user device 210 may determine a path relating to the set of locations. In some implementations, user device 210 may determine the path based on the set of orientations and/or relative displacements, and the set of sensor measurements.

In some implementations, a path may include a path between a first location and a second location, and/or a direction in which an object travels or moves. For example, a path may include a path of movement of user device 210 (or a user of user device 210) through a space.

In some implementations, when determining the path, user device 210 may identify the set of locations based on the set of orientations and/or relative displacements, and the set of sensor measurements relating to the one or more measurable parameters. For example, user device 210 may identify a location by determining an orientation and/or relative displacement of user device 210 from an initial location (e.g., identify a current location of user device 210 by determining that user device 210 is 10 steps north of an initial location). Additionally, or alternatively, and as another example, user device 210 may determine a location of user device 210 by determining that a sensor measurement of a measurable parameter matches another prior sensor measurement at a known location. In this case, user device 210 may determine that user device 210 is at the same location as another prior sensor measurement based on a match of the prior sensor measurement and a measurement of user device 210. In this way, user device 210 may efficiently determine a location of user device 210, thereby conserving processing resources of user device 210.

In some implementations, user device 210 may determine an initial first path (e.g., a candidate path, a potential path, or an estimated path) using information identifying the set of orientations and/or relative displacements of user device 210. For example, user device 210 may use a dead reckoning technique to determine the first path (e.g., by detecting steps and/or turns of a user of user device 210 from an initial location). In some implementations, user device 210 may determine the first path using information related to multiple paths of user device 210 (e.g., multiple paths of multiple user devices 210). Additionally, or alternatively, rather than using the paths of multiple user devices 210 to determine the first path, user device 210 may use multiple paths of a single user device 210 (e.g., paths from different times) to determine the first path. In some implementations, the first path may represent a vector translation of orientations, relative displacements, and/or sensor measurements of measurable parameters in a space through which user device 210 is moving.

In some implementations, user device 210 may determine the first path based on an enhanced dead reckoning technique. For example, an inherent error in dead reckoning may reduce the accuracy of determining a first path of user device 210. In this case, user device 210 may reduce or eliminate an inherent error by assuming that sensor measurements of certain measurable parameters will be the same as, or similar to, other measurements of the same measurable parameter gathered at the same location or at multiple locations that are spatially proximate (e.g., the distance between the multiple locations satisfies a threshold, the multiple locations are within a threshold proximity, etc.). For example, user device 210 may observe similar sensor measurements (e.g., that differ by a threshold amount) at a particular location even if user device 210 has moved around an area of interest before returning to the particular location where a previous sensor measurement was gathered.

In some implementations, when determining the first path, user device 210 may determine a first path such that measurements for a location differ by a threshold amount (e.g., or multiple locations, where the distance between the multiple locations satisfies a threshold). In this way, user device 210 may use an enhanced dead reckoning technique to determine a first path, thereby improving determination of the first path.

In some implementations, user device 210 may use an objective function to generate a score that indicates a manner in which a first path matches the measurements of motion and measurable parameters gathered by user device 210 (e.g., an accuracy of the first path). For example, the first path may identify estimates of movement of user device 210 based on dead reckoning (or enhanced dead reckoning as described above), absolute or relative positions, or relative or absolute distances and bearings combined with an initial location, of user device 210, and/or the like. Continuing with the previous example, user device 210 may use the objective function to determine an extent to which the first path matches measurements of measurable parameters, satisfies a set of rules, and/or the like. In some implementations, a threshold score of the objective function may indicate that the first path matches the measurements gathered by user device 210, satisfies the set of rules, the likelihood that the first path indicates a manner in which user device 210 moved through a space or among a set of locations, and/or the like.

In some implementations, when determining a score using the objective function, user device 210 may compare a first portion of the first path (e.g., determined through dead reckoning) and a second portion that user device 210 estimates to be within a threshold distance to the first portion, but which is separated in time, to obtain an indication of the likelihood that the two portions of the first path are actually spatially proximate. For example, user device 210 may use sensor measurements of measurable parameters to assess how representative the first path determined, for example, from dead reckoning is of the actual path taken by user device 210. Continuing with the previous example, if user device 210 determines that two sensor measurements of a measurable parameter were obtained at the same location based on the dead reckoning technique, but the two sensor measurements differ by a threshold amount, then user device 210 may determine that the two portions of the first path corresponding to the two sensor measurements are not actually spatially proximate and that the dead reckoning technique produced an inaccurate first path.

In some implementations, user device 210 may determine a score based on identifying a potential error with the first path. In some implementations, and for a dead reckoning technique, user device 210 may identify a potential error when the set of sensor measurements for a location fail to match another set of sensor measurements for the same location (e.g., determined previously by user device 210 and/or by another user device 210).

Additionally, or alternatively, and for a dead reckoning technique, user device 210 may identify a potential error where the dead reckoning technique indicates that user device 210 (or a user of user device 210) made a threshold quantity of turns of a threshold angle in a threshold amount of time (e.g., five 180 degree turns in 10 seconds), or a threshold quantity of steps during a time period (e.g., 30 steps in five seconds). For example, this may indicate a measurement error associated with a sensor of user device 210.

In some implementations, and for detected steps, user device 210 may analyze variations to the measured step length and step direction on an individual step basis, and/or may analyze the variations in groups. For example, when user device 210 combines measurements from different user devices 210, user device 210 may map the measurements to normalized coordinate systems that are rotated with respect to each other in a horizontal and vertical plane. Additionally, or alternatively, user device 210 may normalize based on different users having different mean step lengths.

Additionally, or alternatively, user device 210 may use information identifying a spatial layout of a space (e.g., a map, a blueprint, a picture, etc.) to identify a potential error with a first path determined using a dead reckoning technique. For example, user device 210 may determine whether the determined first path intersects a wall or other object identified by the spatial layout information (e.g., indicating a potential error with the first path).

In some implementations, user device 210 may process an image of a space to determine the spatial layout when using the information identifying the spatial layout to identify a potential error (e.g., to identify a wall or an object associated with a space). For example, user device 210 may use image processing, pattern recognition, computer vision, and/or the like to identify an object, a wall, etc. in an image of a space through which user device 210 is moving, and may determine whether the determined first path intersects the object, the wall, and/or the like (e.g., indicating a potential error with the determined first path).

In some implementations, user device 210 may determine a score for the first path based on whether information indicates that distance moved in a portion of the determined first path differs from the movement measured by a sensor of user device 210. For example, when user device 210 determines that a difference between a distance moved in a portion of a determined first path differs from the movement measured by a sensor of user device 210 by a threshold amount, user device 210 may determine a higher or lower score for the first path. Additionally, or alternatively, user device 210 may determine a score for the first path based on determining whether a direction of movement in a portion of a determined first path differs from a direction of movement measured by a sensor of user device 210.

Additionally, or alternatively, user device 210 may determine a score for a first path based on determining whether sensor measurements of a measurable parameter for different portions of the first path that are determined to be spatially proximate (e.g., the distance between the different portions satisfies a threshold) differ by a threshold amount. For example, different sensor measurements of the measurable parameter may indicate that user device 210 gathered the sensor measurements at different locations, rather than at the same location as indicated by the first path.

In some implementations, user device 210 may determine a second path. For example, user device 210 may determine the second path based on a potential error identified for the first path, when the score for the first path fails to satisfy a threshold, and/or the like. In some implementations, user device 210 may determine a second path that improves a score relative to the first path that user device 210 determined using dead reckoning, that reduces or eliminates a potential error identified with respect to the first path, that satisfies a set of rules, and/or the like.

In some implementations, user device 210 may determine a second path using a technique. For example, in some implementations, user device 210 may determine the second path at random (e.g., user device 210 may generate one or more random second paths). Additionally, or alternatively, and as another example, user device 210 may determine the second path based on a hill climber algorithm. Additionally, or alternatively, and as another example, user device 210 may determine the second path based on a simulated annealer. Additionally, or alternatively, and as another example, user device 210 may determine the second path based on a particle swarm optimization (PSO) technique.

In some implementations, the second path may improve location estimates of sensor measurements of a measurable parameter. For example, the second path may reduce or eliminate a discrepancy between sensor measurements at a particular location associated with the first path. Additionally, or alternatively, the second path may improve consistency between multiple estimates of distance traveled between multiple portions of the first path. Additionally, or alternatively, the second path may improve consistency between estimates of bearing traveled between multiple portions of the first path.

In some implementations, user device 210 may determine a score for the second path. For example, user device 210 may determine a score for the second path similar to that described above with respect to a first path. In some implementations, the score may be improved relative to the score for the first path. For example, user device 210 may have determined a score for the first path based on an accumulation of position error in each successive step position estimate. Continuing with the previous example, when user device 210 determined the second path based on attributes that the true step positions and sensor measurements should exhibit, user device 210 may have reduced the step position estimate error. Continuing still with the previous example, user device 210 may determine a score for the second path that is improved relative to the score for the first path by reducing position error of estimated steps.

Additionally, or alternatively, user device 210 may determine a score for the second path that is improved relative to the score for the first path when, for example, new step positions with similar sensor measurements are determined to be spatially proximate in the horizontal and/or vertical plane (e.g., where sensor measurements for location that are a threshold distance apart differ by a threshold amount). Additionally, or alternatively, user device 210 may determine a score for the second path that is improved relative to the score for the first path when, for example, the determined trajectory of user device 210 is normal (e.g., includes sequences of straight lines and curves rather than sharp turns).

Additionally, or alternatively, user device 210 may determine a score for the second path that is improved relative to the score for the first path when, for example, the second path is modified from the first path to eliminate instances where the first path intersected fixed barriers such as walls, windows, desks, fixed furniture, equipment, and/or the like. Additionally, or alternatively, user device 210 may determine a score for the second path that is improved relative to the first path where, for example, step directions and/or lengths identified by the first path differ from the actual measured step direction and length (as measured by a sensor of user device 210) by a threshold amount. Additionally, or alternatively, user device 210 may determine a score for the second path that is improved relative to the score for the first path where, for example, intersections of the first path are modified such that the difference between sensor measurements at an identified intersection of the second path satisfy a threshold (e.g., where a difference between sensor measurements at an intersection of the first path did not satisfy the threshold).

In some implementations, when determining a score for a second path, user device 210 may minimize the objective function based on a range of different non-linear optimization techniques for generating a second path, a set of estimated step positions, and/or sensor measurements of measurable parameters that differ from measured values of user device 210 by a threshold amount, but which are more consistent and accurate. In some implementations, user device 210 may reduce potential errors with the first path more robustly and/or more quickly in multiple stages. For example, in a first stage, user device 210 may divide determined paths into sub-paths and determine a path using rigid translations and rotations of the sub-paths. In some implementations, in a second stage, user device 210 may determine a path where each step position is permitted to vary individually. In this case, user device 210 may use the output of the first stage as the input to the second stage. In this way, user device 210 improves determination of a second path by processing information in multiple stages.

In some implementations, when determining a path, user device 210 may perform a first optimization technique (e.g., a rigid path PSO technique). For example, user device 210 may separate a determined path (and related sensor measurements) of each user device 210 into individual sub-paths. Continuing with the previous example, user device 210 may apply a clustering algorithm (e.g., K-means clustering) to sensor measurement vectors, which may result in a discrete set of sensor measurement clusters, where each sensor measurement cluster is associated with an N-dimensional centroid of the sensor measurement cluster. Continuing still with the previous example, user device 210 may assign each step an index of a sensor measurement cluster with which the sensor measurement vector of the step is associated.

In some implementations, user device 210 may calculate a centroid position and/or orientation for a sub-path. In some implementations, the calculated centroid position and/or orientation may minimize a function (e.g., a cost function), such that a sum of the square of the distances between all step positions that share the same index of a sensor measurement cluster is minimized.

In some implementations, user device 210 may determine whether a determined path satisfies a requirement. For example, user device 210 may determine whether a determined path satisfies a requirement that estimated step positions have similar sensor measurements of a measurable parameter at a common geographic location (e.g., that sensor measurements obtained a threshold distance apart differ by a threshold amount). In some implementations, when determining whether a determined path satisfies a requirement, user device 210 may determine a vector comprising each of a centroid X (e.g., a centroid of an x-axis or a horizontal axis), a centroid Y (e.g., a centroid of a y-axis or vertical axis), and an orientation angle of each sub-path of a determined path. In some implementations, user device 210 may use the determined vector as input to a PSO technique. For example, when using a PSO technique, user device 210 may use a scale of randomization for various particles associated with the PSO technique that spans the size of the area of interest (e.g., the space through which user device 210 is moving). In some implementations, the PSO technique may output horizontal coordinates, vertical coordinates, and/or orientations of each sub-path such that a function based on discrepancies in sensor measurements is minimized.

In some implementations, user device 210 may perform a second optimization technique (e.g., a full PSO technique). For example, user device 210 may adjust the initial position of a sub-path of a determined path so that a centroid and orientation of the initial position of the sub-path are the same as a centroid and orientation calculated in the first optimization technique described above. In some implementations, during the second optimization technique, user device 210 may determine another vector that comprises the horizontal coordinate and vertical coordinate for each step in each sub-path adjusted in the first optimization technique described above. For example, user device 210 may use the other vector as input for another PSO technique, in which user device 210 may vary the horizontal axis and/or vertical axis values for each estimated step. In some implementations, user device 210 may restrict a scale of randomization for the other PSO technique to a level smaller than the area of interest (e.g., smaller by a threshold amount).

In some implementations, user device 210 may use longitude and/or latitude to identify step positions, locations of sensor measurements, and/or the like. For example, user device 210 may register an origin and/or compass bearing for a step coordinate system. Continuing with the previous example, user device 210 may continuously record GPS position measurements during data collection activity, when GPS data is available, and may average estimated GPS horizontal and vertical data, and linearly translate step positions so that the step positions share the same centroid in latitude and/or longitude as the GPS measurements. Continuing still with the previous examples, user device 210 may continuously record an estimate of magnetic north (e.g., as measured in the coordinate system), may average the recorded values (e.g., using an angular average algorithm), and may rotate the coordinate system of user device 210 to align with magnetic north.

In some implementations, once user device 210 has determined a path (e.g., a first path or a second path) that has a threshold score, user device 210 may determine a spatial representation of the measurable parameter that user device 210 measured (e.g., using information about the spatial distribution of the measured parameter at discrete points). In some implementations, to determine the spatial representation, user device 210 may sample information about the sensor measurements of the measured parameter in various ways, and may, for example, assign a single value to each of a grid of tiles on a grid map. For example, user device 210 may determine the single value based on an average, mean, median, weighted average, weighted mean, weighted median, rounded average, a value closest to a center of a set of values, and/or the like, of a set of sensor measurements at a location.

In some implementations, when determining the spatial distribution, user device 210 may assume that the sensor measurements are approximately constant over time at a given location, thereby improving an efficiency of determining the spatial distribution. In some implementations, given the estimated position for each step during the data collection activity, user device 210 may average the sensor measurements over the time interval for each step and may construct a map based on each estimated step position and measurement average. In some implementations, user device 210 may determine the spatial representation when a determined path (e.g., a first path or a second path) has a threshold score.

In some implementations, user device 210 may determine the path in real time or near real-time. For example, user device 210 may determine the path as user device 210 moves through a space. Additionally, or alternatively, user device 210 may determine a path using information from different user devices 210 or from the same user device 210 at different times (e.g., provided the actual environment can be considered constant over a time period).

In this way, user device 210 may determine a path relating to a set of locations based on a set of orientations and/or relative displacements, and a set of sensor measurements.

As further shown in FIG. 4, process 400 may include performing an action based on determining the path (block 450). For example, user device 210 may perform an action based on determining the path.

In some implementations, user device 210 may sample sensor measurements to generate a grid map, a heat map, and/or the like, of a measurable parameter (e.g., by taking an average, mean, median, weighted average, weighted mean, weighted median, a centroid, a value closest to the centroid, etc. of a cluster of sensor measurements).

Additionally, or alternatively, user device 210 may use information to apply a dead reckoning technique in a three-dimensional coordinate system, such as via use of a barometric pressure sensor to estimate relative height, thereby reducing or eliminating difficulties in determining absolute height based on changes to barometric pressure over relatively short periods of time and displacements. For example, user device 210 may use the information to generate a three-dimensional map of an area. In this way, user device 210 may detect when a user of user device 210 is ascending or descending a flight of stairs, in an elevator, and/or the like. In this way, user device 210 may construct a spatial map of a measurable parameter without the need for external positioning measurements, such as GPS. Moreover, user device 210 may not require prior knowledge of an environment (e.g., the location or configuration of access points, base stations, the signal propagation environment, a site survey, etc.) to generate a spatial map of a measurable parameter.

In some implementations, user device 210 may generate a spatial map in parallel with gathering data for determining the path. In this way, the spatial representation may be continuously updated in real-time.

In some implementations, user device 210 may subsequently estimate a location of user device 210 based on the resulting spatial map. For example, user device 210 may use the spatial map to geo-locate another user device 210 that may or may not have participated in gathering the sensor measurements used to generate the spatial map. As a specific example, a subscriber (e.g., a customer) of a communication service may experience a problem with Wi-Fi service in a home of the subscriber. Additionally, or alternatively, and continuing with the previous example, there may be a problem with Wi-Fi coverage at a location of a television of the customer (e.g., a bit rate that the television can achieve is limited and the high definition television (HDTV) experience is poor).

In this case, user device 210 may measure, at various locations, the channel allocations and utilization of various access points and wireless signal levels at the location of the television. Continuing, user device 210 may identify a location to which to relocate the access points, a location to which to add a wireless signal extender or a new access point, and/or a location to which to relocate the television. For example, user device 210 may identify the location by measuring the wireless signal strength at various locations.

In this way, user device 210 may reduce an amount of time needed for identifying and fixing an issue related to a wireless signal, reduce an amount of technical experience needed to identify and fix an issue related to a wireless signal, and/or the like.

In some implementations, user device 210 may collect the sensor data to construct a spatial representation of a measurable parameter that a technician will need to troubleshoot and resolve a problem (e.g., RSSI, bit rates, access point identifiers, frequency channel allocations, etc.). For example, user device 210 may collect the sensor data passively while a customer moves around a premises as part of the normal routine of the customer.

Additionally, or alternatively, for wireless signals, user device 210 may identify a source of wireless signal interference and/or identify a potential location for a wireless signal extender or similar type of device. For example, user device 210 may identify a location where a signal strength of a wireless signal satisfies a threshold and may identify a source of wireless signal interference based on identifying a signal strength of other wireless signals and/or by using a map of an area to identify a potential source of wireless signal interference (e.g., a wall), and/or may identify the location as a potential location for a wireless signal extender.

Additionally, or alternatively, user device 210 may perform performance engineering in a wireless communication network. For example, a Wi-Fi service in an area of interest (e.g., a shopping mall, stadium, etc.) may experience performance issues (e.g., coverage holes, interference, congestion, etc.). In this case, user device 210 may collect information about movement, direction, and Wi-Fi signal characteristics, for example, based on deploying the data collection capability to a subset of the user devices 210 (e.g., smartphones, tablet computers, etc.) in an area of interest. For example, user device 210 may deploy the data collection capability to the user devices 210 of staff at a facility (e.g., cleaners, vendors, security, etc.) and/or may deploy the capability as part of an application that visitors to the area can download for information, navigation, discounts, and/or the like. In some implementations, user device 210 may build a map of Wi-Fi characteristics (e.g., signal strength, signal quality, access point identifier, channel allocation, etc.) based on the collected data. For example, the map may indicate one or more locations of areas of poor performance, and user device 210 may provide information for display related to potential remedies.

In some implementations, user device 210 may automatically alter a network configuration based on a sensor measurement. For example, user device 210 may alter an amount of power used for a wireless signal (e.g., to improve the wireless signal), may recommend moving a location of a network device so as to improve the network device's access to the wireless signal, and/or the like. Additionally, or alternatively, user device 210 may perform automated optimization of the parameters of the wireless communication network using one or more automated and/or algorithmic methods based on the data collected with location estimates. For example, the methods may include use of self-organizing network (SON) technology, and/or the like.

In some implementations, and for a wireless signal, once user device 210 has collected data for a threshold amount of time, and has covered a threshold amount of a premises, user device 210 may provide the information to another user device 210 associated with a technician to permit the technician to examine the resulting spatial distributions of the sensor data, troubleshoot the problem as being due to poor coverage, design a remedy involving deployment of a wireless signal extender, identify a location for a wireless signal extender, and/or the like. In this way, user device 210 may reduce or eliminate a need for a technician to visit a customer premises, and may reduce an amount of time spent troubleshooting an issue related to a wireless signal or other measurable parameter.

Additionally, or alternatively, and for a wireless signal, rather than instructing where the customer should place additional hardware or to where existing hardware should be moved, the customer experiencing the problem may use an application, on user device 210, that indicates the new location. For example, user device 210 may provide a map for display that indicates on the map the new location, as determined by the technician and/or user device 210, along with the current location of user device 210. Additionally, or alternatively, and continuing, user device 210 may indicate the new location by guiding the customer to the correct location for new or additional hardware with an arrow or another indicator provided for display on a screen of user device 210, thereby indicating the direction in which the customer should move to find the correct location.

Additionally, or alternatively, user device 210 may geo-locate based on sensor measurements from another user device 210. For example, a first user device 210 may identify a location of the first user device 210, or a second user device 210, based on determining whether a difference between a sensor measurement of the first user device 210 and a sensor measurement of the second user device 210 satisfies a threshold. As a specific example, a first user device 210 may receive information from a second user device 210 identifying a wireless signal signature of a combination of wireless signals being received by the second user device 210 and may use pattern recognition to geo-locate the second user device 210 based on wireless signal signatures detected by the first user device 210 at a previous time. In this way, a first user device 210 may conserve processing resources of a second user device 210 by reducing or eliminating a need for the second user device 210 to perform dead reckoning.

In some implementations, user device 210 may perform geolocation without performing a dead reckoning technique based on information associated with a spatial map (e.g., determined based on performing a passive survey of measurable parameters when using a dead reckoning technique).

Additionally, or alternatively, user device 210 may use the methods described herein in combination with another system for geolocation. For example, user device 210 may utilize a GPS location module outside a building, or when a GPS signal is available. Additionally, or alternatively, and as another example, user device 210 may be prevented from utilizing a geolocation module that uses line of sight propagation when the geolocation module lacks a line of sight. Continuing with the previous example, in this case, user device 210 may obtain geolocation of user device 210 from a different module, such as a GPS module, until the GPS module cannot be used, after which user device 210 may perform a dead reckoning technique to continue geolocation.

In some implementations, user device 210 may use location information related to other user devices 210 to analyze flows of people and/or devices around and/or within an area of interest. For example, user device 210 may determine potential vendor locations, locations at which to deploy advertising, and/or the like, based on the location information (e.g., without a need to survey the area). Additionally, or alternatively, user device 210 may calibrate an access point-based geolocation system based on receiving information from a subset of the other user devices 210 (e.g., handsets) as the subset of user devices 210 moves through an area of interest (e.g., by comparing estimates of location using a dead reckoning technique and estimates of location relative to known locations of access points).

Additionally, or alternatively, user device 210 may identify a source of interference related to a wireless signal at a location. For example, user device 210 may identify a structure (e.g., a wall) or another device as a source of interference of a wireless signal at a location. Additionally, or alternatively, user device 210 may identify one or more indicators of a customer experience at one or more locations. For example, abnormal movement by user device 210 may indicate a negative customer experience (e.g., due to confusion of the customer). Additionally, or alternatively, user device 210 may identify an RSSI, or other measurable parameter, at a location.

Additionally, or alternatively, user device 210 may generate a report that identifies a sensor measurement and/or a determined path. In some implementations, user device 210 may provide information identifying a sensor measurement and/or a determined path. For example, user device 210 may send a message that identifies a sensor measurement and/or a determined path, such as to another user device 210 and/or server device 220.

Additionally, or alternatively, user device 210 may trigger an alarm. For example, user device 210 may trigger an alarm when a sensor measurement satisfies a threshold. As specific examples, user device 210 may detect the presence of a hazard (e.g., heat, cold, radiation, a biological hazard, fire, a chemical, a potential or actual explosion, etc.) and may provide information for display that identifies the nature of the hazard and a location of the hazard.

In this way, user device 210 may perform an action based on determining the path.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Implementations, described herein, provide a user device that is capable of utilizing information regarding other measurements of the user device (e.g., a sensor measurement of a measurable parameter at a location) and an optimization procedure to perform location determination with a reduced error rate relative to using a dead reckoning technique based on relative displacements and relative orientations. In this way, user device 210 may determine a location with a greater accuracy relative to using the dead reckoning technique and at a time when GPS information is unavailable or insufficiently accurate. Moreover, information identifying the one or more other measurements may be stored to generate a spatial distribution of the other measurements. The spatial distribution may be utilized for a subsequent geolocation without performing the dead reckoning technique, for radio communication system performance engineering, and/or the like.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items, and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more processors configured to:
      determine a set of orientations or relative displacements at a set of locations, the set of locations including at least a first location and a second location;
      determine a set of sensor measurements relating to one or more measurable parameters at the set of locations;
      determine, based on the set of orientations or relative displacements at the set of locations and the set of sensor measurements relating to the one or more measurable parameters at the set of locations, a path relating to the set of locations,
      where the one or more processors, when determining the path, are to:
         determine a first path based on the set of orientations or relative displacements at the set of locations,
         compare a sensor measurement associated with a first portion of the first path and a sensor measurement associated with a second portion of the first path that is within a threshold distance of the first portion of the first path,
         determine the sensor measurement associated with the first portion of the first path differs from the sensor measurement associated with the second portion of the first path by at least a threshold amount, and
         modify the first path to obtain a second path based on the sensor measurement associated with the first portion of the first path differing from the sensor measurement associated with the second portion of the first path by at least the threshold amount; and
      perform an action based on determining the path.

2. The device of claim 1, where the one or more processors, when determining the path, are configured to:
   determine the first location to be within a threshold proximity to the second location based on:
      the set of orientations or relative displacements indicating a threshold displacement between the first location and the second location, and
      a first sensor measurement, of the set of sensor measurements, being within a threshold amount of a second sensor measurement of the set of sensor measurements.

3. The device of claim 2, where the one or more processors are further configured to:
   identify the set of locations based on the set of orientations or relative displacements at the set of locations and the set of sensor measurements relating to the one or more measurable parameters at the set of locations.

4. The device of claim 1, where the one or more processors are further configured to:
   receive information identifying a particular sensor measurement of a particular measurable parameter of the one or more measurable parameters; and
   determine a particular location corresponding to the particular sensor measurement based on the particular measurable parameter, the set of sensor measurements, and identifying the set of locations.

5. The device of claim 1, where the one or more processors, when determining the path, are configured to:
   utilize a particular optimization technique to determine the path based on the set of sensor measurements and the set of orientations or relative displacements,
      the particular optimization technique including at least one of:
         a hill climber algorithm,
         a simulated annealer,
         a particle swarm optimization technique, or
         an evolutionary algorithm.

6. The device of claim 1, where the one or more processors, when determining the path, are configured to:
   modify the first path based on at least one of:
      a set of rules related to determining the path, or
      a first score associated with the first path that fails to satisfy a threshold score; and
   determine the second path based on:
      the second path satisfying the set of rules, or
      the second path being associated with a second score that satisfies the threshold score.

7. The device of claim 1, where the one or more processors, when performing the action, are configured to:
perform an analysis of the path that includes identifying:
a flow of people or devices through a space,
one or more locations at which to deploy advertising,
one or more locations at which to deploy a wireless signal extender,
one or more locations that correspond to one or more sources of interference of a wireless signal,
one or more locations associated with one or more indicators of a customer experience, or
a received signal strength indicator (RSSI).

8. The device of claim 1, where the one or more processors are further configured to:
receive information related to the set of orientations or relative displacements from multiple devices prior to determining the set of orientations or relative displacements; and
map the information to a normalized coordinate system to permit determination of the path after receiving the set of orientations or relative displacements.

9. A non-transitory computer-readable medium storing instructions, the instructions comprising:
one or more instructions that, when executed by one or more processors, cause the one or more processors to:
receive information related to a set of orientations or relative displacements at a set of locations,
the set of locations including at least a first location and a second location;
determine the set of orientations or relative displacements at the set of locations after receiving the information related to the set of orientations or relative displacements,
the set of orientations or relative displacements being determined from the first location of the set of locations;
determine a set of sensor measurements relating to one or more measurable parameters at the set of locations;
determine, based on the set of orientations or relative displacements at the set of locations and the set of sensor measurements relating to the one or more measurable parameters at the set of locations, a path relating to the set of locations,
the first location being associated with a first sensor measurement, of the set of sensor measurements, and the second location, of the set of locations, being associated with a second sensor measurement of the set of sensor measurements,
where the instructions that cause the one or more processors to determine the path, cause the one or more processors to:
determine a first path based on the set of orientations or relative displacements at the set of locations,
compare a sensor measurement associated with a first portion of the first path and a sensor measurements associated with a second portion of the first path that is within a threshold distance of the first portion of the first path,
determine the sensor measurement associated with the first portion of the first path differs from the sensor measurement associated with the second portion of the first path by at least a threshold amount, and
modify the first path to obtain a second path based on the sensor measurement associated with the first portion of the first path differing from the sensor measurement associated with the second portion of the first path by at least the threshold amount; and
perform an action based on determining the path.

10. The non-transitory computer-readable medium of claim 9, where the one or more instructions, that cause the one or more processors to determine the path, cause the one or more processors to:
perform a first optimization technique on the path after determining the path; and
perform a second optimization technique on the path after performing the first optimization technique.

11. The non-transitory computer-readable medium of claim 9, where the one or more instructions, when executed by the one or more processors, further cause the one or more processors to:
determine a coordinate system to use when determining the set of orientations or relative displacements; and
where the one or more instructions, that cause the one or more processors to determine the set of orientations or relative displacements, cause the one or more processors to:
determine the set of orientations or relative displacements after determining the coordinate system.

12. The non-transitory computer-readable medium of claim 9, where the one or more instructions, when executed by the one or more processors, further cause the one or more processors to:
determine whether the first location and the second location are within a threshold proximity based on a result of comparing the first sensor measurement and the second sensor measurement; and
determine a score based on determining whether the first location and the second location are within the threshold proximity.

13. The non-transitory computer-readable medium of claim 9, where the one or more instructions, that cause the one or more processors to determine the set of orientations or relative displacements, cause the one or more processors to:
determine the set of orientations or relative displacements using an image or video captured by a camera of a device.

14. The non-transitory computer-readable medium of claim 9, where the one or more instructions, that cause the one or more processors to perform the action, cause the one or more processors to:
perform geolocation of a device based on another set of sensor measurements of the device after determining the path.

15. A method, comprising:
determining, by a device, a set of orientations or relative displacements at a set of locations,
the set of locations including at least a first location and a second location;
determining, by the device, a set of sensor measurements relating to one or more measurable parameters at the set of locations,
the set of sensor measurements being determined by a sensor of the device as the device moves among the set of locations;
determining, by the device, a path relating to the set of locations based on the set of orientations or relative displacements at the set of locations and the set of sensor measurements relating to the one or more measurable parameters at the set of locations, the path being determined using a processing technique that permits identification of a manner in which the device moved among the set of locations,
where determining the path includes:
determining a first path based on the set of orientations or relative displacements at the set of locations,
comparing a sensor measurement associated with a first portion of the first path and a sensor measurement associated with a second portion of the first path that is within a threshold distance of the first portion of the first path,
determining the sensor measurement associated with the first portion of the first path differs from the sensor measurement associated with the second portion of the first path by at least a threshold amount, and
modifying the first path to obtain a second path based on the sensor measurement associated with the first portion of the first path differing from the sensor measurement associated with the second portion of the first path by at least the threshold amount; and
performing, by the device, an action based on determining the path.

16. The method of claim 15, where performing the action comprises:
determining a spatial map of the one or more measurable parameters after determining the path; and
outputting the spatial map for display.

17. The method of claim 15, where determining the path comprises:
determining a first score for the first path after determining the first path,
the first score indicating a first likelihood that the first path indicates the manner in which the device moved among the set of locations,
the first path being modified based on the first score;
determining a second score for the second path after determining the second path;
repeating determining the first path, determining the first score, modifying the first path, or determining the second score until the second score satisfies a threshold score that the first score failed to satisfy; and
where performing the action comprises:
performing the action after the second score satisfies the threshold score.

18. The method of claim 17, where modifying the first path comprises:
modifying the first path based on at least one of:
a location, of the set of locations, being associated with multiple sensor measurements that differ by a threshold amount,
the first path indicating a threshold quantity of turns of a threshold angle during a first time period,
the first path indicating a threshold quantity of steps during a second time period, or
the first path intersecting an object identified by a spatial map.

19. The method of claim 15, where performing the action comprises:
performing an analysis of the path that includes identifying:
a flow of people or devices through a space,
one or more locations at which to deploy advertising,
one or more locations at which to deploy a wireless signal extender,
one or more locations that correspond to one or more sources of interference of a wireless signal,
one or more locations associated with one or more indicators of a customer experience, or
a received signal strength indicator (RSSI).

20. The method of claim 15, further comprising:
receiving information related to the set of orientations or relative displacements from multiple devices prior to determining the set of orientations or relative displacements; and
mapping the information to a normalized coordinate system to permit determination of the path after receiving the set of orientations or relative displacements.

* * * * *